United States Patent [19]
Anderson

[11] Patent Number: 5,898,869
[45] Date of Patent: Apr. 27, 1999

[54] METHOD AND SYSTEM FOR PCMCIA CARD BOOT FROM DUAL-PORTED MEMORY

[75] Inventor: Daniel Joseph Anderson, Richmond, Va.

[73] Assignee: The Foxboro Company, Foxboro, Mass.

[21] Appl. No.: 08/716,983

[22] Filed: Sep. 20, 1996

[51] Int. Cl.[6] .................................................. G06F 9/00
[52] U.S. Cl. ............................................................ 395/652
[58] Field of Search ................................... 395/651, 652, 395/653

[56] References Cited

U.S. PATENT DOCUMENTS

| | | | |
|---|---|---|---|
| 4,943,911 | 7/1990 | Kopp et al. | 364/200 |
| 5,329,579 | 7/1994 | Brunson | 379/88 |
| 5,537,654 | 7/1996 | Bedingfield et al. | 395/834 |
| 5,659,680 | 8/1997 | Cunningham et al. | 395/183.01 |
| 5,687,346 | 11/1997 | Shinohara | 395/430 |

FOREIGN PATENT DOCUMENTS

0 62 8908 A1   12/1994   European Pat. Off. .

*Primary Examiner*—Dennis M. Butler
*Attorney, Agent, or Firm*—Jules Jay Morris; David Barron; Terrence Martin

[57] ABSTRACT

A PCMCIA card includes a processor and a dual-ported memory thereon. The PCMCIA card is plugged into a host, such that both the PCMCIA card's processor and the host have access to the dual-ported memory. Upon initialization, the host will load the dual-ported memory will a boot sequence for the processor on the PCMCIA card. The processor on the PCMCIA card is then released from a reset state, and proceeds to boot from the boot sequence loaded by the host. The processor on the PCMCIA card is released from reset by the host accessing a predetermined location within the address space of the PCMCIA card.

30 Claims, 5 Drawing Sheets

METHOD AND SYSTEM FOR PCMCIA CARD BOOT FROM DUAL-PORTED MEMORY

TECHNICAL FIELD

The present invention relates, in general, to PCMCIA cards. In particular, the present invention relates to a PCMCIA card having a dual-ported memory thereon, wherein the PCMCIA card boots from a program stored in the dual-ported memory by an attached host.

BACKGROUND OF THE INVENTION

The progression of computing technology brings with it, at each generation, reduced size and increased performance. Hardware that once occupied a room has been reduced in size to a box, a single IC chip, or merely a portion of an IC chip. This reduction in size has brought with it corresponding packaging advances.

As an example, IBM PC compatible computers use an internal bus structure that accepts expansion cards conforming to a particular form factor. However, when these computers were reduced to the laptop, notebook, and currently palmtop sizes, the standard expansion card was too large and potentially power hungry to be elegantly integrated into this new generation of reduced size computers.

A new standard for expansion card was therefore developed for portable computing devices. Originally known as "IC Cards", later renamed "PCMCIA cards" (i.e., Personal Computer Memory Common Interface Architecture) and most recently renamed "PC Cards", these cards adhere to well defined physical and electrical standards such that they are compatible with a variety of products from different vendors. These cards will be referred to herein as "PCMCIA" cards.

Although technology has brought with it size reduction of components, space within PCMCIA cards remains limited, especially in view of the functional demands placed thereon by customers. Therefore, many problems have been encountered in designing PCMCIA cards with all the technology and features demanded of them, while still conforming to the tight physical space limitations thereof.

One particular set of problems is related to the program storage devices for processors on-board PCMCIA cards. In order for the PCMCIA card processor to initially boot-up when powered, there must be some program loaded within the on-board program storage device. Conventionally, non-volatile storage devices of the rewriteable or one-time-programmable type have been used to hold programming for the card. These devices are typically soldered to the PCMCIA card, since sockets are unreliable, costly, and too large for most PCMCIA applications. The storage devices are often programmed before they are soldered to the PCMCIA printed circuit board.

Programming the program storage devices before "solder down" introduces many problems. For example, additional manufacturing steps are needed to program, test and track the devices. Any added steps in manufacturing add a corresponding cost. Further, if software updates are performed between programming and product shipment, reprogramming is needed. This again adds costs. Moreover, if the storage device was one-time programmable, it must be thrown away, an even more expensive undertaking (especially if it has already been soldered to the board, and must be unsoldered and replaced).

Along with problems related to the programming of the program storage devices, conventional techniques introduce problems in the amount of storage available in such devices. For instance, in the case of one-time programmable devices, any diagnostic code is preloaded therein. This reduces the amount of space available for applications code. A compromise is therefore struck, and limited diagnostics typically results. This increases repair costs.

In the case of reprogrammable program storage devices (for example, flash memory) at least some loader and reconfiguration code is required within the storage device to facilitate an initial load (and reload) of code. Again this takes valuable storage space away from applications code.

By way of further background, previous non-PCMCIA systems have been implemented where a first processor loads a memory shared with a second processor which then boots therefrom. However, these systems have not been configured with an industry standard interface between the processors, let alone a PCMCIA interface. Thus, these previous systems have not had to provide all communications and control necessary to boot from a shared memory, while still adhering to a strictly defined set of standardized communications and control signaling.

The present invention is directed toward solutions to the above-noted problems.

DISCLOSURE OF THE INVENTION

In a first aspect, the present invention includes a PCMCIA card having a processor, a memory coupled to the processor, a PCMCIA interface, reset logic and boot logic. The processor is configured to boot by executing instructions at a boot location within the memory. The PCMCIA interface circuit is configured to couple the PCMCIA card to a host computer. Further, the PCMCIA interface circuit is coupled to the memory such that both the host and the processor have access to the memory when the PCMCIA card is coupled to the host. The reset logic is configured to reset the PCMCIA card and suspend processor execution, and the boot logic is configured to release the suspended processor execution and begin the processor booting at the boot location.

As an enhancement, processor control logic may be coupled to the reset logic, the boot logic and a reset line of the processor. The processor control logic is accordingly configured to activate the reset line in response to the reset logic and deactivate the reset line in response to the boot logic.

As a further enhancement, the boot logic may be coupled to an address bus received from the host. The boot logic may then include address decode circuitry responsive to a particular address presented by the host for releasing the processor execution and causing the processor to boot. Furthermore, the PCMCIA interface may include a single-chip PCMCIA interface and the address decode circuitry may comprise programmable chip select logic within the single-chip PCMCIA interface.

As yet another enhancement the memory may comprise dual-ported memory. The dual-ported memory may include at least one semaphore register such that the dual-ported memory facilitates both booting of the processor and communications between the processor and the host.

In another aspect, the present invention includes a method for operating a PCMCIA card. The PCMCIA card includes a processor and a memory coupled to the processor. Further, the PCMCIA card is mechanically and electrically coupled to a host such that the memory is coupled to the host. The method includes resetting the PCMCIA card, wherein the resetting suspends execution of the processor; downloading code from the host into the memory of the PCMCIA card;

and releasing the suspended processor and causing it to boot using the downloaded code.

As an enhancement, the resetting and the releasing are initiated by separate mechanisms. The resetting may comprise asserting a hardware reset signal, such as, for example, a power-on reset. The resetting may also comprise the host sending a software reset signal.

As another enhancement, the releasing of the suspended processor from reset may include the host accessing an address. The accessing is decoded within the PCMCIA card, thereby causing the suspended processor to boot using the downloaded code.

As further enhancements, the code may include diagnostic routines. The code may also include verification routines such that during booting, the integrity of information within a non-volatile memory on the PCMCIA card is checked (control of the processor may be transferred to a memory address within the non-volatile memory if the integrity of information within the non-volatile memory is good). The code may also include a loader routine for loading a writable memory (e.g., a FLASH memory) on the PCMCIA card.

To summarize, the present invention has many advantages and features associated therewith. By booting a processor of a PCMCIA card from a dual-ported memory that is loaded by an attached host, several advantages are gained. There is no longer a need to pre-program any non-volatile program storage devices resident on the PCMCIA card. The program storage devices may be loaded during PCMCIA card operations by a loader program put into the dual-ported memory by the host. In accord therewith, the loader program is transient within the dual-ported memory and does not require any valuable applications code space within the program storage device. Further, diagnostics are enhanced as the dual-ported memory is a very flexible resource when used to accommodate diagnostic routines. In view of the above, and the following disclosure, the art of PCMCIA cards is advanced.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

According to the present invention, a PCMCIA card is created that can boot its internal processor from a dual-ported memory that is pre-loaded by the host into which the PCMCIA card is plugged. This facilitates great flexibility in operations of the PCMCIA card, for example, in connection with downloading of new programs into on-board flash memory, and with PCMCIA card diagnostics. The same dual-ported memory may also be used for semaphore based communications with the PCMCIA card. Furthermore, after initial booting, the dual-ported memory may be used as a data transfer resource between the host and the PCMCIA card.

Figure 1:
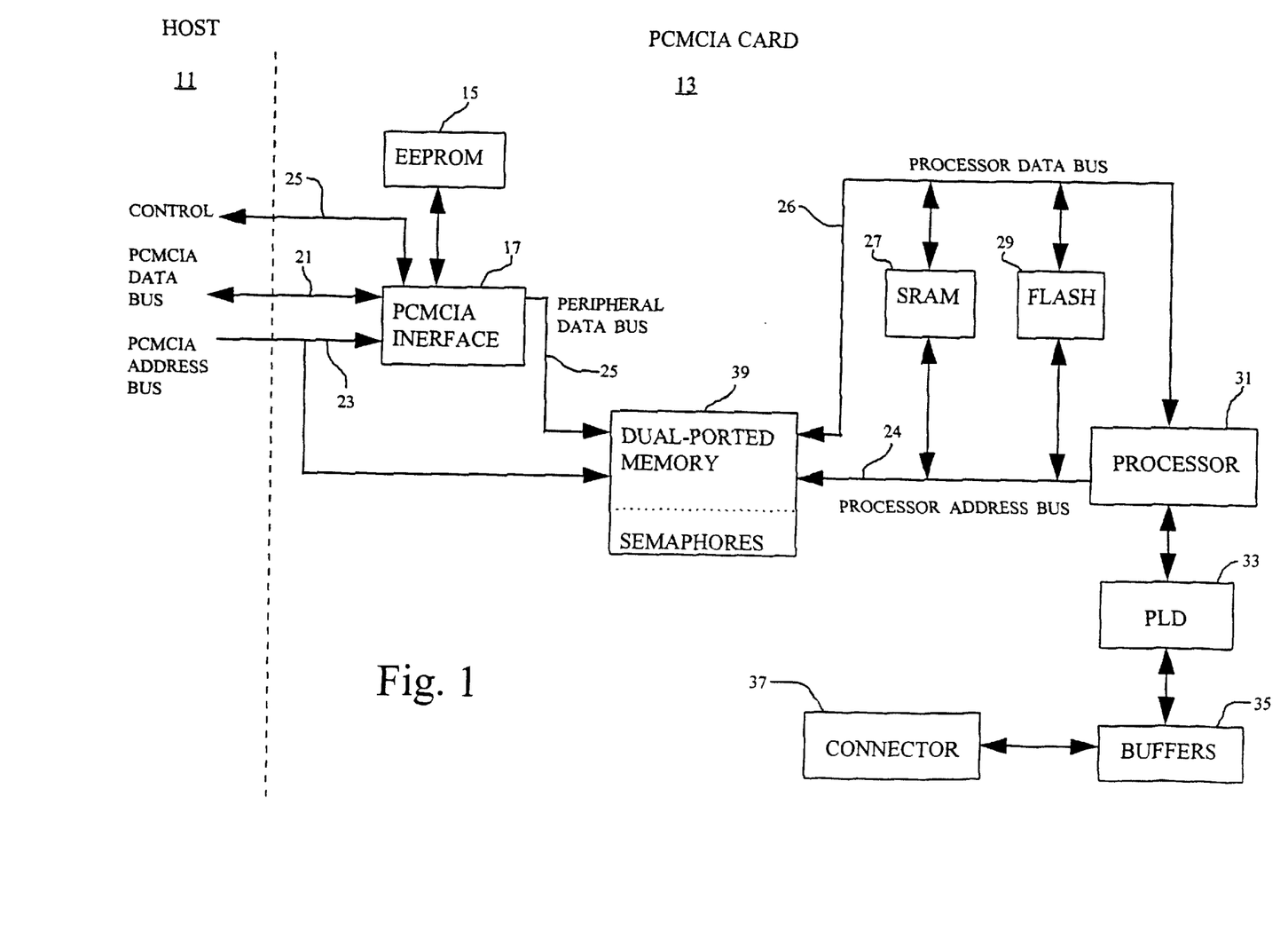
FIG. 1 depicts a block diagram of a PCMCIA card in accordance with an embodiment of the present invention.

Turning to FIG. 1, a block diagram of a PCMCIA card 13 is depicted. PCMCIA card 13 communicates with a host 11 through a PCMCIA data bus 21, a PCMCIA address bus 23 and PCMCIA control signals 25. As an example, host 11 could be a laptop computer having a PCMCIA interface. In another example, host 11 could be a dedicated industrial controller having a PCMCIA interface, such as, for example, the Micro I/A controller from The Foxboro Company of Foxboro, Mass. The PCMCIA-to-host interface is defined within the PC Card standard entitled "PC Card Standard—February 1995" and published by PCMCIA/JEIDA, which is hereby incorporated herein by reference in its entirety.

Within PCMCIA card 13, communications to host 11 using the PC Card standard is achieved using a PCMCIA interface integrated circuit ("IC") 17. In one embodiment, a Zilog brand, model 16M17 controller is used, however, other vendors offer ICs providing similar control functionality. A non-volatile configuration memory 15 operates in connection with PCMCIA interface 17 to store PCMCIA card configuration information used in connection with the PC Card standard.

According to the present invention, a peripheral data bus 25 connects to both the aforementioned PCMCIA interface 17 and a dual-ported memory 39. The PCMCIA address bus 23 also connects to dual-ported memory 39. The size and type of dual-ported memory 39 may vary, but in one embodiment a 4K×16 dual-ported memory is implemented using a pair of 4K×8 dual-ported random access memories ("RAMs"—one RAM for each of the odd and even data busses) from Integrated Device Technologies ("IDT"). During operations, dual-ported memory 39 is preloaded by host 11, and thereafter, a processor 31 on PCMCIA card 13 boots therefrom. Although dual-ported RAMs are used in the preferred embodiment described herein, other memory architectures are possible without departing from the true spirit and scope of the invention. For example, a conventional RAM with logic surrounding it to permit access thereto from both host 11 and processor 31 could be used.

In one embodiment, dual-ported memory 39 may also be used for semaphore based communications between host 11 and processor 31. Accordingly, dual-ported memory 39 includes multiple (for example, sixteen) semaphore registers with associated logic. Addressing of the semaphore registers is provided by selecting a semaphore or memory address space within the dual-ported memory using a control input thereof. Conventional address decode circuitry provides this selection through memory mapping in accordance with the present invention.

To continue, both a static RAM 27 ("SRAM") and a FLASH memory 29 are included on PCMCIA card 13. Each of SRAM 27 and FLASH memory 29 connect to processor 31 through a processor data bus 26 and a processor address bus 24.

As examples, SRAM 27 may be implemented using a pair of model HM628128LT7 128K×8 SRAM IC chips from Hitachi. A pair of these chips is necessary when processor 31 comprises an Intel 80C186EC processor because the writing of a single byte is required. A 16 bit wide SRAM would not typically support a single byte width write. FLASH memory 29 may be a model AM29F400T-75EC 256K×16 FLASH memory IC chip from Advanced Micro Devices. Using a 16 bit wide FLASH memory in connection with, e.g., an Intel 80C186EC processor is permissible, because in the current implementation, byte only writes are not required in the memory space occupied by FLASH memory 29.

To restate, processor 31 is coupled to both processor data bus 26 and processor address bus 24 such that it may operate in connection with FLASH memory 26 and SRAM 27. Furthermore, processor 31 is connected to a programmable logic device ("PLD") 33 that performs many of the control logic functions within PCMCIA card 13. Although not shown, PLD 33 may be connected to almost every device within PCMCIA card 13 to support various functions such as, e.g., address decoding. The specific programming and interconnection of PLD 33 will be apparent to one of ordinary skill in the art in view of this disclosure. In one example, PLD 33 may be a Lattice brand, model ispLSI1016-60LT device and processor 31 may be an Intel 80C186EC microprocessor. Buffering and interfacing are provided by, e.g., buffers 35 and a connector 37 that are tailored to the particular PCMCIA card application requirements. As one example, a serial interface may be implemented using conventional UART ("Universal Asynchronous Receiver Transmitter") technology coupled to conventional RS-232 line drivers. As other examples, industrial control interfaces could be implemented such that the subject PCMCIA card is used in an industrial automation or process control system.

Figure 2:
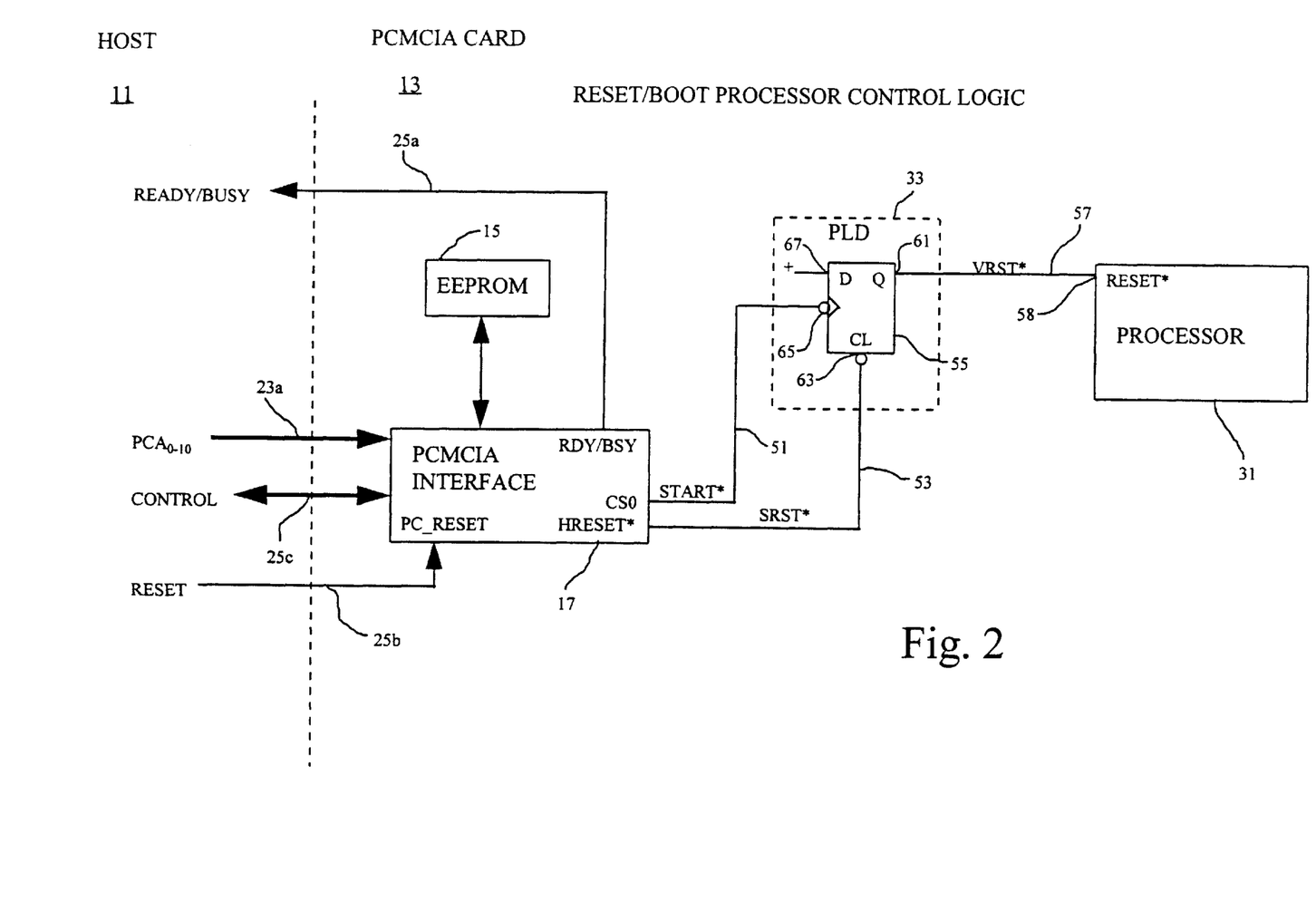
FIG. 2 depicts one example of reset/boot processor control logic within the PCMCIA card of FIG. 1 according to one embodiment of the present invention.

As discussed previously, the techniques of the present invention facilitate the downloading of code into dual-ported memory 39, and the booting of processor 31 therefrom. Depicted in FIG. 2 is the logic used to perform this function in connection with an industry standard PCMCIA interface 17. The signals required to understand the reset/boot processor control logic are depicted in FIG. 2 and are discussed in detail below.

PCMCIA interface 17 is coupled to host 11 by a PCMCIA address bus including address lines 0–10 ($PCA_{0-10}$ 23a) and by control signals including general CONTROL signals 25c, a RESET line 25b and a READY/BUSY line 25a. Further, a HRESET* output ("Host Reset Output"—an active low signal provided by the Zilog brand IC for resetting a processor on the PCMCIA card) and a programmable chip select ("CSO") output (i.e., asserted when its programmed address range is accessed) of PCMCIA interface 17 are shown.

A flip-flop 55 controls the resetting, and accordingly booting, of processor 31. In the current embodiment, flip-flop 55 is implemented within the programmable logic of PLD 33, but could be otherwise implemented in, e.g., discrete logic. Flip-flop 55 is of a D-type and has a Q output 61, a D input 67, a clock input 65 and an asynchronous clear ("CL") input 63. D input 67 is tied to a logic 1 state; Q output 61 is coupled to a RESET* 58 input of processor 31 by VRST* line 57 ("VRST*" is an active low signal for resetting processor 31); clock input 63 is coupled to the CSO output of PCMCIA interface 17 by a START* line 51 ("START*" is an active low signal for starting processor 31); and clear input 53 is coupled to the HRESET* output of PCMCIA interface 17 by SRST* line 53 ("SRST*" is an active low system reset line for resetting processor 31 and other resettable circuitry on PCMCIA card 13, e.g., PLD 33 and buffers 35).

To briefly summarize, operationally, when PCMCIA card 13 is reset through a software or hardware reset, HRESET* is asserted causing flip-flop 55 to clear, lowering its Q output 61, thereby causing processor 31 to enter a reset state. Processor 31 is maintained in reset by Q output 61 of flip-flop 55 while dual-ported memory 39 (e.g., FIG. 1) is loaded with boot code for processor 31. Thereafter, an access by host 11 to PCMCIA card 13 within an address range corresponding to CSO causes the assertion of START* line 51 and the latching of Q output 61 to a logic high state. Processor 31 then leaves its reset state and boots. In the current example, wherein processor 31 is an Intel brand 80C186EC processor, booting begins at memory location FFFF0H, and dual-ported memory 39 is mapped therein such that booting occurs therefrom.

In the current embodiment, the START* signal 51 is responsive to an access by HOST 11 to an I/O space location (e.g., x300H-x3FFH). The particular I/O address is chosen based upon system configuration and is implemented by programming CSO of PCMCIA interface 17 accordingly. As one example, the particular I/O address could be 340H. If multiple PCMCIA cards using the techniques described herein were present in a single system, a second PCMCIA card could use, for example, I/O address 341H to trigger its processor boot.

Figure 3:
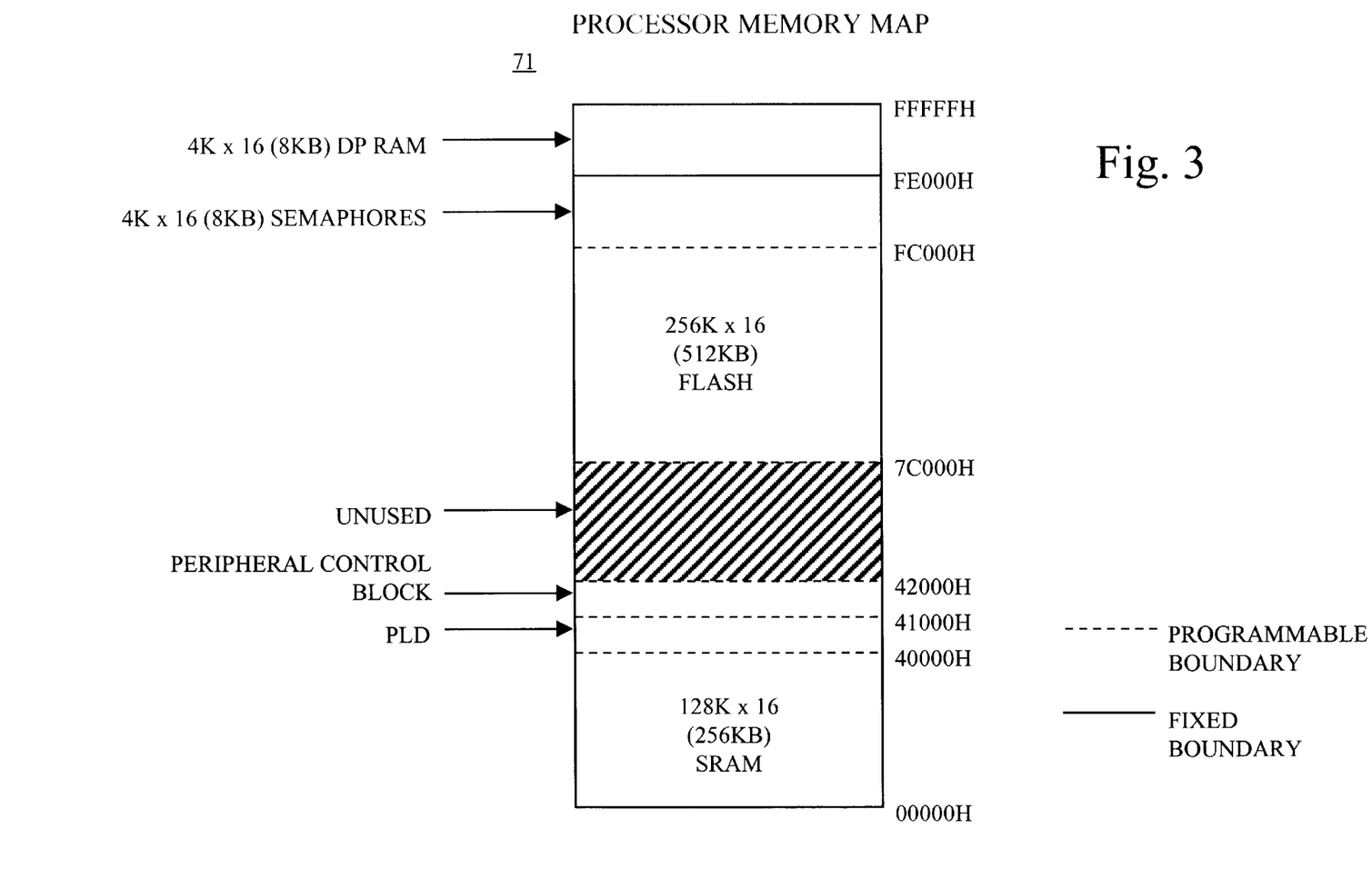
FIG. 3 depicts a processor memory map of the PCMCIA card of FIG. 1 pursuant to an embodiment of the present invention.

Turning to FIG. 3, a processor memory map 71 is shown. Processor memory map 71 corresponds to the address space of processor 31. Beginning at the top address range of the memory map, the 8 KB (kilo-byte) memory space of dual-ported memory 39 is mapped between the addresses of FE000H and FFFFFH. As the boot address of processor 31 is FFFF0H, booting will occur from within dual-ported RAM 39. The semaphore space of dual-ported RAM 39 is mapped below the memory space thereof from locations FC000H to FDFFFH. In the current embodiment, dual-ported memory 39 includes sixteen semaphore registers, therefore, these registers are repeated throughout the 8 KB semaphore memory space (i.e., only the lower 4 bits of the address are relevant regarding the particular semaphore accessed).

The memory space of FLASH memory 29 is mapped below that of dual-ported memory 39 in the 512KB region between addresses 7C000H and FBFFFH. Below that is unused address space (42000H to 7BFFFH).

A peripheral control block is located in the next lower region within processor memory map 71 (memory locations 41000H through 41FFFH). The peripheral control block is an internal region within processor 31 that provides registers for features built into processor 31. For instance, the addressing of programmable chip select outputs of processor 31 is programmed by writing to registers within the peripheral control block. These programmable chip selects are used to implement the programmable and fixed memory boundaries shown in processor memory map 71. Also, I/O lines on processor 31 are set using registers within the peripheral control block. The function and utility of the peripheral control block is well documented in association with, e.g., the Intel brand 80C186EC microprocessor, and thus will be apparent to one of ordinary skill in the art.

A PLD region is located below the peripheral control block in processor memory map 71 and resides from memory locations 40000H to 40FFFH. This memory region is used to pass information to and from PLD 33 (e.g., by selecting PLD 33 through a programmable chip select on processor 31 and exchanging data with it over, e.g., processor data bus 26). In one embodiment, this data passing is used for I/O through buffers 35 and connector 37.

Lastly, regarding processor memory map 71, the 256 KB SRAM 27 is mapped in the bottom memory region from addresses 00000H to 3FFFFH.

Figure 4:
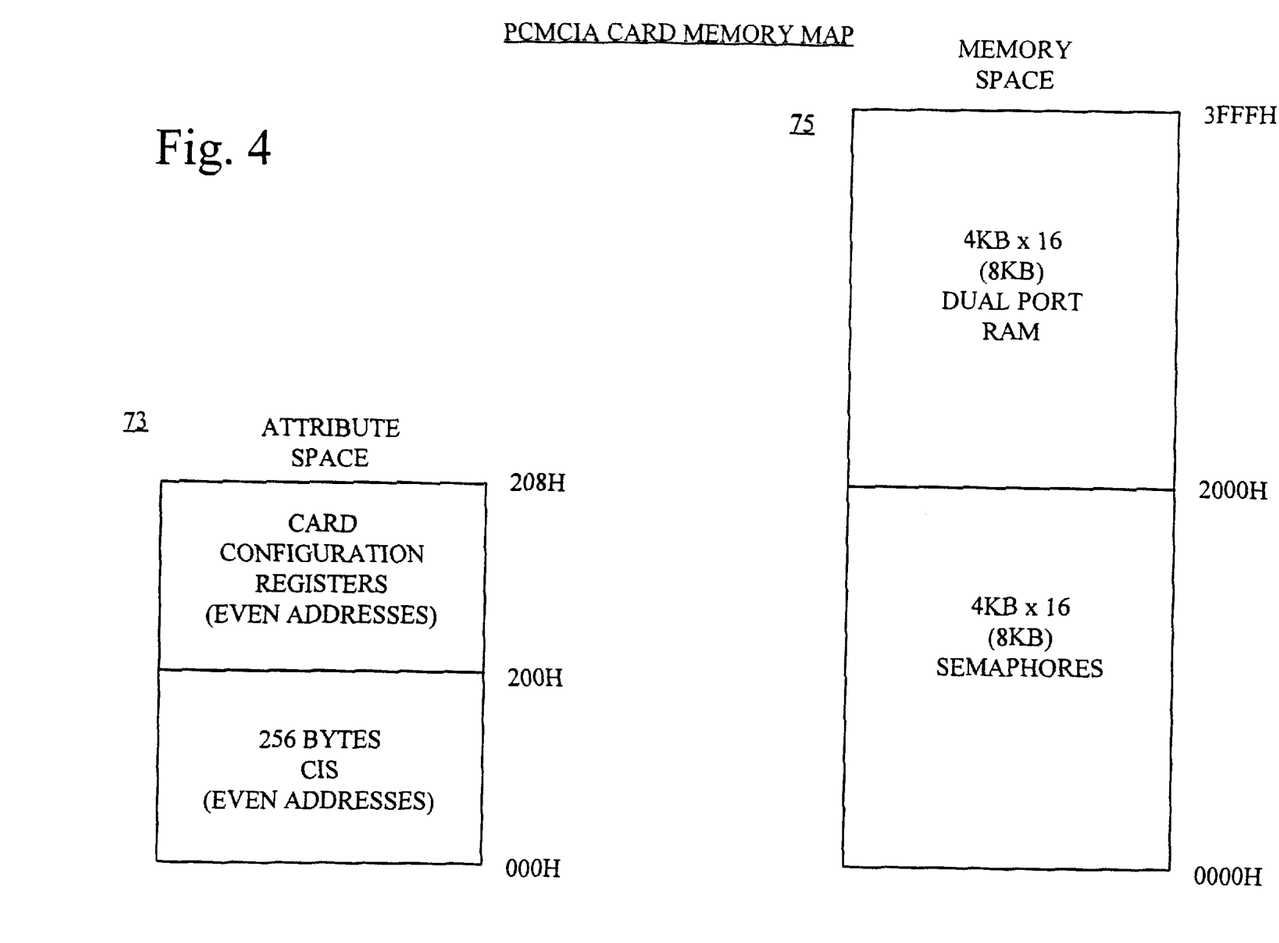
FIG. 4 depicts attribute and memory space memory maps of the PCMCIA card of FIG. 1 in accordance with one embodiment of the present invention.

The address space of PCMCIA card 13, when viewed from host 11, is depicted in an attribute space memory map 73 and memory space memory map 75 of FIG. 4. Attribute space memory map 73 ranges from addresses 000H to 208H and includes CIS ("Card Information Structure") space from even addresses 000H to 1FFH and card configuration registers from even addresses 200H to 208H (i.e., even addresses use $Data_{0-7}$ on a 16 bit system) The attribute space functions in accordance with PCMCIA interface 17 and the PC Card specification.

As discussed hereinabove, dual-ported memory 39 facilitates communications between host 11 and PCMCIA card 13. In accordance therewith, as shown in memory space memory map 75, dual-ported memory 39 is mapped between addresses 0000H and 3FFFH of PCMCIA card 13 as viewed from host 11. This memory space is divided into two 8 KB regions, a first region corresponds to the dual-ported memory itself from 2000H to 3FFFH, and a second 8 KB region corresponds to the semaphore space from addresses 0000H to 1FFFH. The sixteen registers of dual-ported memory 39 repeat throughout the semaphore address space.

The above described addressing scheme and memory mappings facilitate the techniques of the present invention. However, they are given by way of example and are not meant to limit the scope of the present invention. Other addressing schemes and memory maps are possible, and will be apparent to one of ordinary skill in the art in view of this disclosure when applied to particular implementation requirements.

Figure 5:
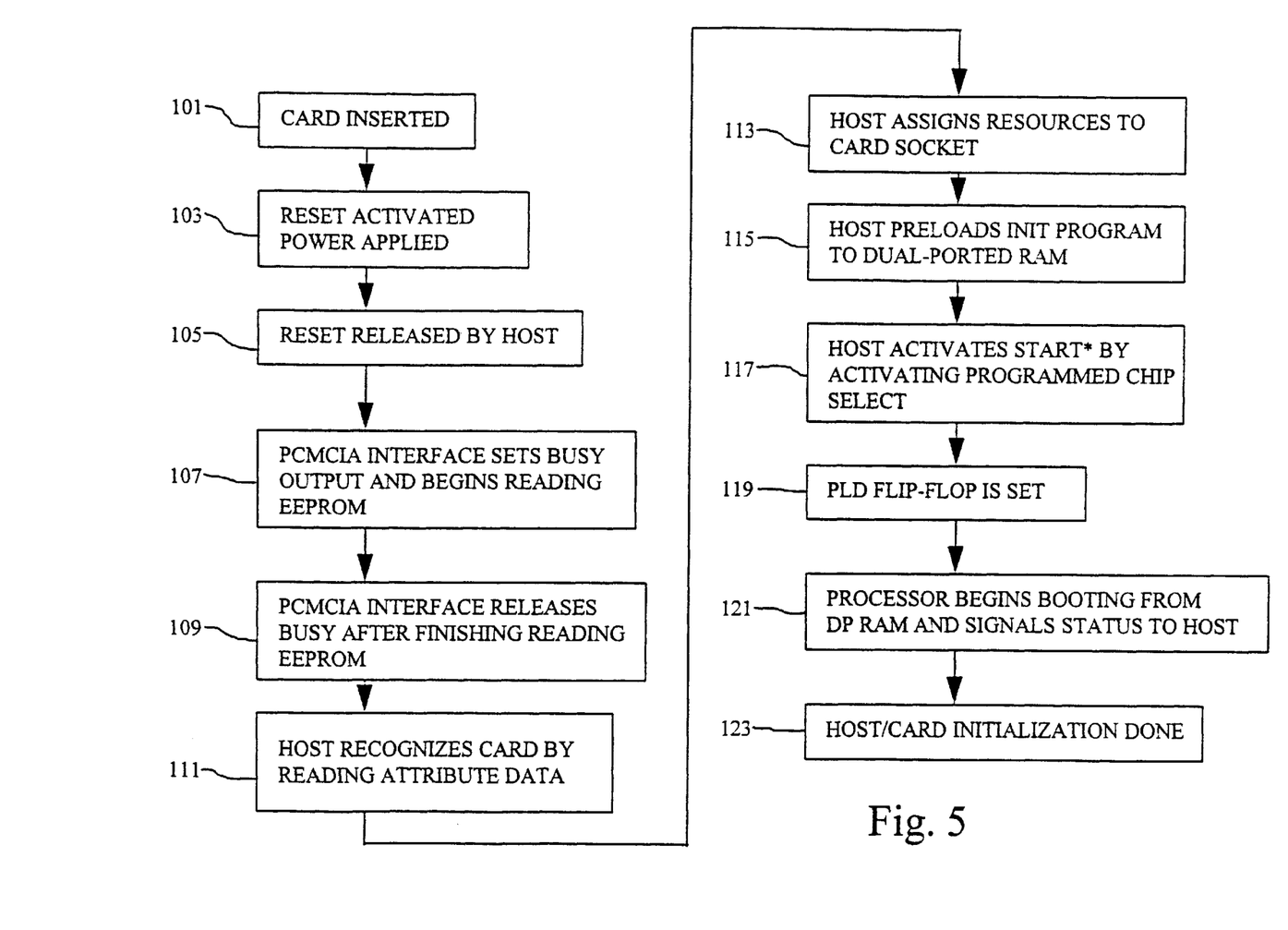
FIG. 5 is a flow-diagram of one example boot sequence of the PCMCIA card of FIG. 1.

One operational sequence according to the present invention is depicted in the flow-diagram of FIG. 5. Throughout this operational discussion, for the purpose of clarity, elements within FIGS. 1–2 will be referenced. Turning to the first step of FIG. 5, PCMCIA card 13 is inserted into host 11 (STEP 101). PCMCIA card 13 is then energized, and RESET signal 25b is activated (STEP 103). In a next step, according to the PC Card standard, RESET signal 25b of PCMCIA card 13 is released by host 11 (STEP 105), PCMCIA interface 17 sets READY/BUSY line 25a to a BUSY state, and PCMCIA interface 17 begins reading configuration information from EEPROM 15 (STEP 107).

Two types of information are read by PCMCIA interface 17. Firstly, data that configures programmable options is read and validated. This includes data that configures, for example, bus width, wait states, and programmable chip selects. Secondly, the CIS data is read, but not evaluated.

After the configuration information is read, READY/BUSY line 25a is set to a READY state (STEP 109), thereby facilitating access to the PCMCIA card 13 by host 11. Although PCMCIA card 13 has finished its reset cycle, processor 31 remains halted per flip-flop 55.

While PCMCIA card 13 is continuing through the aforementioned process, host 11 is waiting for READY/BUSY line 25a to indicate a READY state. When the READY state is asserted, host 11 assigns a temporary memory window used to read the CIS data from PCMCIA card 13, reads the CIS data (loaded from EEPROM 15) and determines the identity of PCMCIA card 13 (STEP 111).

Having read the CIS data, host 11 determines if it can supply the necessary memory, I/O and interrupts needed by PCMCIA card 13. If not, PCMCIA card 13 is rejected and no resources are assigned. If host 11 is capable of the above-discussed resource assignments, host 11 assigns appropriate system resources to PCMCIA card 13, or more specifically, to the PCMCIA host side interface circuitry/socket (STEP 113). The reading of PCMCIA attribute data and assigning of resources thereto are performed according to the PC Card specification.

To continue, host 11 (by way of driver software associated with PCMCIA card 13) transfers a boot code sequence (i.e., initial program) into dual-ported memory 39 of PCMCIA card 13 (STEP 115). After the code transfer, host 11 activates START* signal 51 through a memory access to a predetermined location within the address range of PCMCIA card 13 (STEP 117). This precipitates a setting of flip-flop 55 (STEP 119), thereby forcing VRST* signal 57 high and causing processor 31 to boot (STEP 121). The boot process continues completing the above-described initialization process (STEP 123).

The boot sequence may have several functions and will vary based upon application requirements. As a first example, the boot sequence could check the validity of the contents of FLASH memory 29 using, for example, a checksum. If valid, program control would be transferred to a predetermined address within FLASH memory 29. In a second example, the boot sequence could include a loader program used to download a program from host 11 to FLASH memory 29. This technique facilitates an initial loading, or updating, of the contents of FLASH memory 29. As a third example, the boot program may include diagnostic routines for PCMCIA card 13. This eliminates the need for any code space within FLASH memory 29 for diagnostic routines, thereby freeing the entire contents thereof for applications programs. During diagnostic program execution, as needed, further diagnostic code can be loaded from host 11 into dual-ported memory 39. Virtually limitless diagnostic code space is thereby provided, without the use of any permanent on-board memory (e.g., FLASH memory 29).

Described above are examples of techniques for booting a PCMCIA card from a dual-ported memory. It will be apparent to those of ordinary skill in the art that the above-described flows and sequences of steps are only examples. There can be many variations to the above, including, for instance, processing more or less than the steps described above, modifying one or more of the steps, or changing the order of some steps without departing from the true spirit and scope of the present invention. These variations are, therefore, considered a part of the claimed invention.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

I claim:

1. A PCMCIA card comprising:
   a processor configured to boot by executing instructions at a boot location;
   a memory coupled to said processor, said memory containing said boot location and containing a memory integrity checking program for a region of a non-volatile memory within said PCMCIA card, and containing instructions to transfer program execution to code within said non-volatile memory after successful completion of said integrity checking;
   a PCMCIA interface circuit configured to couple said PCMCIA card to a host computer, said PCMCIA interface circuit being coupled to said memory such that both said host and said processor have access to said memory when said PCMCIA card is coupled to said host;

reset logic configured to reset said PCMCIA card and suspend processor execution; and boot logic configured to release said suspended processor execution and begin said processor booting at said boot location.

2. The PCMCIA card of claim 1, further comprising processor control logic coupled to said reset logic, said boot logic and a reset line of said processor, said processor control logic configured to activate said reset line in response to said reset logic and deactivate said reset line in response to said boot logic.

3. The PCMCIA card of claim 2, wherein said processor control logic includes a flip-flop.

4. The PCMCIA card of claim 3, wherein said flip-flop comprises a logic function within a programmable logic device.

5. The PCMCIA card of claim 1, wherein said reset logic is coupled to a reset output of said PCMCIA interface that is responsive to both a hard and a soft reset initiated by said host.

6. The PCMCIA card of claim 5, wherein said PCMCIA interface includes a single-chip PCMCIA interface, and wherein said reset logic comprises a portion of said single-chip-PCMCIA interface that drives said reset output thereof.

7. The PCMCIA card of claim 1, wherein said boot logic is coupled to an address bus received from said host.

8. The PCMCIA card of claim 7, wherein said boot logic includes address decode circuitry responsive to a particular address presented by said host for releasing said suspended processor execution and causing said processor to boot.

9. The PCMCIA card of claim 8, wherein said PCMCIA interface includes a single-chip PCMCIA interface and said address decode circuitry comprises programmable chip select logic within said single-chip PCMCIA interface.

10. The PCMCIA card of claim 1, wherein said memory comprises a dual-ported memory.

11. The PCMCIA card of claim 10, wherein said dual-ported memory includes at least one semaphore register such that said dual-ported memory facilitates both booting of said processor and communications between said processor and said host.

12. The PCMCIA card of claim 11, further comprising address decode circuitry coupled to said dual-ported memory such that each of a memory space of said dual-ported memory and a semaphore space of said dual-ported memory are mapped into different memory regions of said processor.

13. The PCMCIA card of claim 1, wherein said memory comprises a bootable memory.

14. The PCMCIA card of claim 13, wherein said non-volatile memory comprises a FLASH memory.

15. The PCMCIA card of claim 1, wherein said memory comprises a bootable memory and said PCMCIA card further comprising a volatile memory coupled to said processor.

16. A method for operating a PCMCIA card, said PCMCIA card including a processor and a memory coupled to said processor, said PCMCIA card being mechanically and electrically coupled to a host such that said memory is coupled to said host, said method comprising:

(a) resetting said PCMCIA card, said resetting suspending execution of said processor;

(b) downloading code from said host into said memory of said PCMCIA card; and (c) releasing said suspended processor and causing it to boot using said downloaded code, wherein said downloaded code includes diagnostic routines which check an integrity of a non-volatile memory within the PCMCIA card upon said boot, and transfers processor execution to code within said non-volatile memory if said integrity is good.

17. The method of claim 16, wherein said resetting and said releasing are initiated by separate mechanisms.

18. The method of claim 17, wherein resetting comprises asserting a hardware reset signal.

19. The method of claim 18, wherein said hardware reset signal results from a power-on reset.

20. The method of claim 17, wherein said resetting includes said host sending a software reset signal.

21. The method of claim 17, wherein said releasing includes said host accessing an address, said accessing being decoded within said PCMCIA card, thereby causing said releasing said suspended processor and causing it to boot using said downloaded code.

22. The method of claim 16, wherein said memory comprises a bootable memory, said PCMCIA card includes a writeable memory coupled to said processor, and said code includes a loader routine such that said method further includes loading said writeable memory from said host through execution of said loader routine.

23. The method of claim 22, wherein said writeable memory comprises non-volatile memory.

24. The method of claim 22, wherein said writeable memory comprises FLASH memory.

25. The method of claim 24, further comprising passing information between said host and said processor of said PCMCIA card through said bootable memory.

26. The method of claim 25, wherein said bootable memory comprises a dual-ported memory having at least one semaphore register therein, said method including exchanging information between said host and said processor of said PCMCIA card using said at least one semaphore register.

27. A method for operating a PCMCIA card, said PCMCIA card including a processor and a memory coupled to said processor, said PCMCIA card being mechanically and electrically coupled to a host through a PCMCIA interface, such that said memory is coupled to said host, said method comprising:

(a) transmitting a reset signal from said host to said PCMCIA card, through said PCMCIA interface, said reset signal resetting said PCMCIA card and thereafter, leaving said processor in a suspended state and said memory in an active state;

(b) transferring a program from said host to said PCMCIA Card through said PCMCIA interface while said processor is suspended, said program including a memory integrity checking program for a region of a non-volatile memory within said PCMCIA card, and instructions to transfer program execution to code within said non-volatile memory after successful completion of said integrity checking, (c) transmitting a release signal from said host to said PCMCIA card, through said PCMCIA interface; and (d) said processor beginning execution of said program in response to said release signal.

28. The method of claim 27, wherein said transmitting a reset signal includes asserting a hardware reset line of said PCMCIA interface.

29. The method of claim 28, wherein said transmitting a release signal comprises said host accessing a predetermined memory location.

30. A PCMCIA card in an operational state, said PCMCIA card comprising:

a processor in a suspended state, said processor configured to boot by executing instruction at a boot location upon exiting said suspended state, a dual-ported RAM in an active state, said dual-ported RAM being coupled to said processor and containing a program beginning at said boot location, said program including a memory integrity checking program for a region of a non-volatile memory within said PCMCIA card, and instructions to transfer program execution to code within said non-volatile memory after successful completion of said integrity checking; and a PCMCIA interface coupled to said dual-ported RAM to facilitate access thereto by a host.

* * * * *